INVENTORS
HANS HOPPE
GÜNTER DÖRING
WOLFGANG ULRICH
HEINZ SCHERZBERG
KLAUS KÄSEBERG

BY

Nolte & Nolte

ATTORNEYS

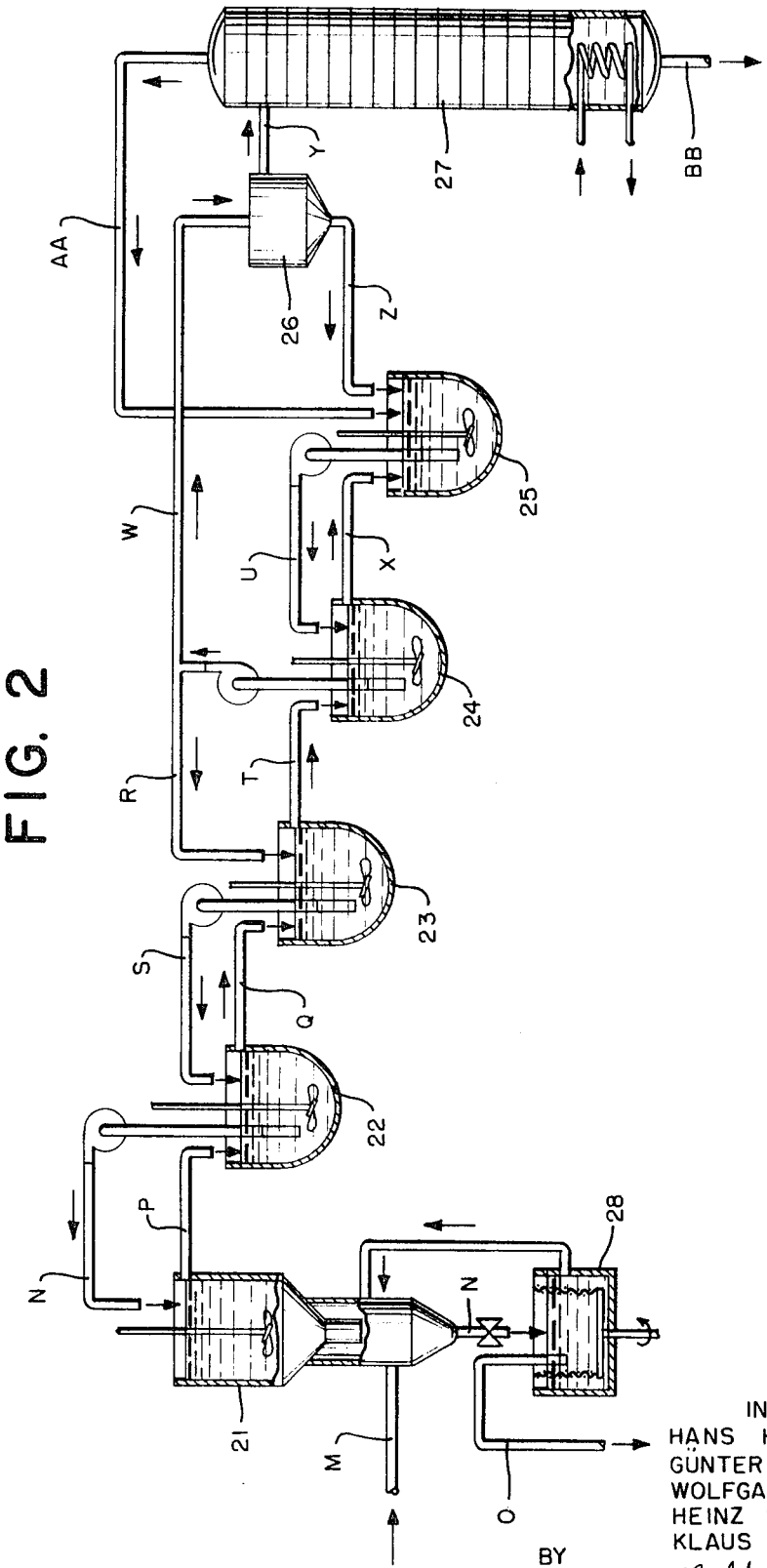

3,597,168
RECOVERY OF LARGE GRAINS OF $Na_2SO_4$ AND $(NH_4)_2SO_4$ FROM AQUEOUS METHANOL SOLUTIONS
Hans Hoppe, Gunter Döring, Wolfgang Ulrich, Heinz Scherzberg, and Klaus Kaseberg, Sondershausen, Germany, assignors to VEB Kombinat Kali, Sondershausen, Germany
Filed Dec. 11, 1968, Ser. No. 782,868
Int. Cl. B01d 9/02
U.S. Cl. 23—300                                    3 Claims

ABSTRACT OF THE DISCLOSURE

Method of recovering a salt from a saturated aqueous solution thereof in which the aqueous salt solution, optionally containing organic precipitant, is mixed with a more concentrated solution of the organic precipitant and the differential between the organic precipitant concentration in the saturated salt solution and that in the solution mixed therewith is so selected that crystallization of the salt takes place entirely in the metastable range.

---

Figure 1:
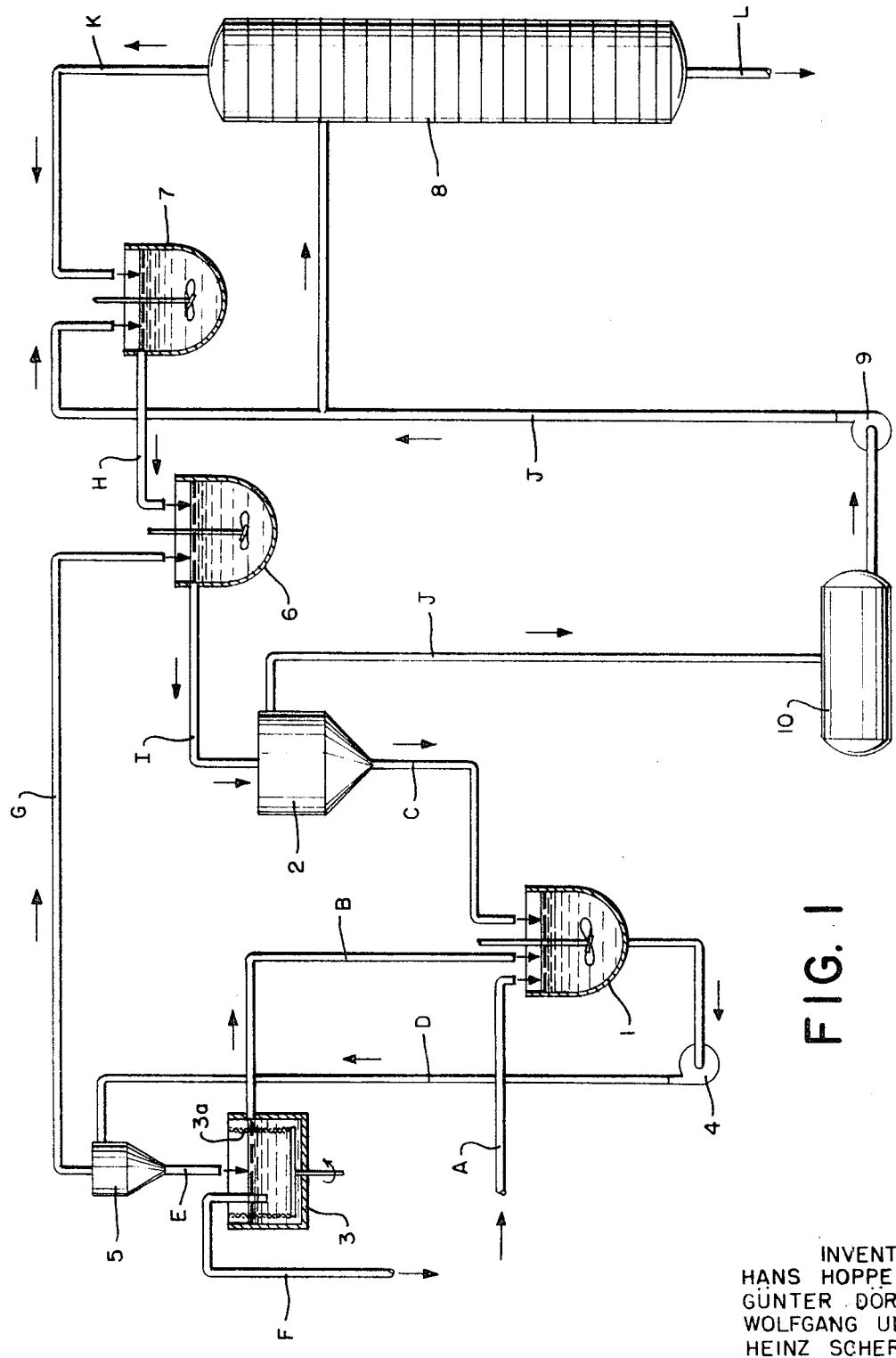

This invention relates to the recovery of salts, from aqueous solutions thereof, in the form of large grains.

The production of large grain dust-free crystallizates is in the field of industrial salt recovery one of the most difficult problems. In order to obtain large grain crystallizates, it has been necessary to carry out the salt separation by cooling, flash evaporation or ordinary evaporation. With respect to crystallization by decreasing the solubility of the salt in the aqueous medium by the addition thereto of an organic solvent (i.e., by solubility displacement), which in recent times has been becoming of ever greater importance, generally only a very fine grain crystallizate is obtainable thereby, which crystallizate is difficult to dry.

In contrast to crystallization by evaporation or by cooling, crystallization by solubility displacement with organic substances does not allow crystallization to proceed to completion in the metastable range and spontaneous crystallization to be avoided. Even if the organic precipitant is added to the salt solution stepwise in numerous portions rather than all at once, spontaneous crystallization will prevail and a large number of very small crystals will crystallize out. A controlled crystallization according to the heretofore state of technoogy is possible neither by a discontinuous nor by a continuous addition of organic precipitant. Production of the desired large crystals from organic-aqueous solutions has been possible only by slowly raising the proportion of the organic constituent, for example an alcohol, by means of water extraction or by means of mixing the salt solution and the organic precipitant exclusively by a diffusion process. Both methods, which are in use in the laboratory, are not practical for commercial production. Accordingly, up to the present time, the use of these methods for the recovery of salts from aqueous solutions commercially has been only on a very small scale.

A fine grained crystallizate obtained by displacement crystallization leads to considerable loss of the organic solvent component since a sufficient recovery thereof is possible only if the crystallizate is thoroughly washed and then dried to a small residual moisture content. The costs of crystallization methods are in large measure influenced by the quality of the crystallizates and the feasibility of a controlled displacement crystallization has a decisive influence on the economy of the method and its competitiveness with other crystallization methods.

According to the invention, there is provided a displacement crystallization method which avoids highly uneconomical loss of the organic precipitant. According to the invention, there is provided a controlled displacement crystallization in which there is obtained large grain size crystallizate which is easily washable and centrifugable in a centrifugal sieve and by means of which crystallization there is avoided the economically intolerable loss of constituents, particularly the organic precipitant.

It has been found according to the invention that there is always obtained well constructed large crystals if instead of aqueous salt solution and salt-free organic precipitant there are employed solutions of different contents of aqueous salt solution and organic component admixed. Large grain crystallizates are always produced, for example, if a saturated aqueous sodium sulfate solution is mixed not with pure methanol but with a sodium sulfate saturated methanol and water containing solution with a methanol content of 20 to 25% by weight. Likewise, according to the invention, a saturated sodium sulfate solution of 20% methanol content can be mixed with 40% aqueous methanol or a saturated sodium sulfate solution in 40% methanol can be mixed with 60% methanol, for example, and the like. In other words, it is simply necessary to maintain a differential of 20 to 25% between the methanol content of the aqueous medium saturated with sodium sulfate and the aqueous methanol added thereto. On the other hand, even by careful mixing of saturated sodium sulfate solution and methanol, there always forms only a very fine precipitate.

For the production of acceptably large grain crystallizates, a direct mixing of aqueous salt solution and organic precipitant must be avoided and there must be substituted therefor a mixing of solutions so selected that at no point in the crystallization process is there exceeded a certain precipitant concentration differential between the solutions being mixed, whereby spontaneous crystallization is avoided. The permissible concentration differential for the solutions being mixed together is simply determined for a given system by systematic mixing experiments of saturated salt solutions with mixtures of water and the organic precipitant in various concentrations. It is determined which of these solutions admixed with the salt solution produces a supersaturated solution which holds over a certain period of time without spontaneous nuclei formation. Thus, for example, for the recovery of ammonium sulfate with the use of methanol by the method of the invention it is necessary to maintain a differential of 25 to 35% between the methanol content of the aqueous medium saturated with sodium sulfate and the aqueous methanol added thereto.

The breadth of the metastable supersaturated zone is decisive in determining into how many mixing steps the concentration differential between the salt solution and the precipitant must be distributed. It is, therefore, to be kept in mind that the type and manner of mixing, for example the rate of revolution of the stirrer, influences the breadth of the metastable range in certain ways, as is also true for the methods of controlled crystallization by evaporation or cooling. The intermediate solutions resulting from the individual mixing processes are fed into the appropriate mixing stages either as precipitants or are added to the precipitated solution, i.e., the mother liquor, of that stage, whereby, as a whole, there is provided a counter-mixing effect for the solution issuing from the last stage. In this way, the supersaturated solution produced by the mixing process remains within the boundaries for the avoidance of spontaneous crystallization and the crystallization can be controlled as desired. The supersaturation manifests itself during the crystallization process by the growth of crystals already present or by the formation of a small number of crystals, as is known in crystallization processes by cooling or evaporation. There are formed well constructed, large crystals or crystal agglomerates which are readily separated from the solution containing the organic component. Special apparatus is not necessary for the carrying out of the method of the invention. The crystallizer apparatuses developed for evaporation crystallization are just as suitable as simple stirring vessels for the method of the invention. The quality of the crystallizate can be further improved as in conventional methods employing evaporation crystallizers by classification of the crystallizate and recycle of the fines to the supersaturated zone in the crystallizer apparatus.

The crystallizate may be removed from that stage of the crystallization in which the crystallizate has the smallest concentration of the organic component and may be introduced into the fresh salt solution. Thereby, the fresh solution and the crystallizate may be brought into counter current contact and thereby, residual organic component washed from the crystallizate. This washing can be combined with in-stream classification of the crystallizates.

The invention will now be further described by reference to the following examples in conjunction with the drawings, the drawings being two flow sheets (FIG. 1 and FIG. 2) for processes according to the invention, FIG. 1 being for the recovery of sodium sulfate and FIG. 2 being for the recovery of ammonium sulfate.

EXAMPLE 1

Controlled crystallization of sodium sulfate

A stream A of saturated sodium sulfate solution (FIG. 1) is continuously introduced into the stirring vessel 1. Also introduced into the stirring vessel 1 is the filtrate stream B from a centrifuge 3 which is provided with a rotary screen 3a. Finally, also introduced into the stirring vessel 1 is the bottom flow C from the thickener 2. The relative rates of the streams is adjusted so that the methanol content in the stirring vessel is about 22.5% by weight based on the weight of the solvent, i.e. both water and methanol, exclusive of the salt. All concentrations hereinabove and hereinafter expressed are on this basis. The bottom flow from the thickener 2 has a methanol concentration of 45%. Therefore, the concentration differentials are 0 versus 22.5% and 45.0 versus 22.5%, which are within the permitted boundaries for supersaturation for the controlled crystallization of sodium sulfate. The contents of the stirring vessel 1 is by means of a pump 4 fed as a stream D to hydrocyclone 5. The flow E from the bottom of the cyclone 5, containing predominantly large grain crystals of sodium sulfate, is fed to the centrifuge 3. The centrifuged salt F is removed from the centrifuge 3 and washed and dried (not shown) and the filtrate B from the centrifuge is cycled to the stirring vessel 1. The top flow G from the hydrocyclone 5, which contains fine grains of the sodium sulfate, is led into a second stirring vessel 6 and there continuously mixed with a stream H of 67.5% methanol from a third stirring vessel 7. The input into stirring vessel 7 is controlled so that the methanol concentration therein is maintained at 45%. The maximum concentration differential is, therefore, the difference between 22.5% and 45% and the difference between 45% and 67.5%, i.e. in all cases 22.5%, whereby spontaneous crystallization is also prevented in the stirring vessel 7. The contents I of the vessel 6 is led to a thickener 2 for clarification thereof and the top flow J from the vessel 2 is led to a holding tank 10. From the tank 10 the liquid J is fed in part to a rectification column 8 and in part to the vessel 7. The distillate produced at the top of the rectification column 8, aqueous methanol of 90% methanol content, is fed (K) to the vessel 7. In the vessel 7, mixing with the 45% methanol stream J and the 90% methanol stream K takes place to produce in the vessel 7, 67.5% methanol. Thus, the maximum concentration differential occurring at the vessel 7 is again 22.5% methanol.

From every 1,000 kg. of 40° C. saturated sodium sulfate solution is crystallized out a total of 310 kg. sodium sulfate, calculated on water-free basis. Of that amount, 64% is crystallized out in the stirring vessel 1. 674 kg. water and 17 kg. sodium sulfate is permitted to be lost as a methanol-free solution L to the sump of the distillation column 8. The yield of the crystallization process is 95%, based on the sodium sulfate input.

EXAMPLE 2

Controlled crystallization of ammonium sulfate

A saturated ammonium sulfate solution M (FIG. 2) is stirred up in a classifying crystallizer with a suspension comprising a solution of ammonium sulfate the solvent of which is 30% methanol and suspended therein ammonium sulfate crystals. The thereby resulting 15% methanol solution relieves itself of its supersaturation by causing grain growth of the already present crystals. From the salt slurry outlet a thickened, classified and of its organic components washed-free ammonium sulfate N is withdrawn which is subsequently centrifuged in a centrifuge 28, removed (O) from the centrifuge and dried (not shown). The top flow P from the crystallizer 27 is introduced into a stirring vessel 22, in which is maintained a 45% methanol solution. The 30% methanol solution in the stirring vessel 2 is, in part, cycled to the crystallizer 21 and, in part, fed (Q) to a stirring vessel 23 in which a mixing thereof with a suspension of ammonium sulfate in 60% methanol (R) takes place. The resulting 45% methanol solution, in which crystallized ammonium sulfate is likewise suspended, is divided into two streams, one stream S being fed to the stirring vessel 22 and the other stream T being fed to a third stirring vessel 24. To the stirring vessel 24 from a fourth stirring vessel 25 is pumped a 75% methanol solution U to form in the stirring vessel 24 a 60% methanol solution. From the stirring vessel 24, three streams, R, W and X, are fed. Stream R is fed to the stirring vessel 23, stream W is fed to a clarifying tank 26 and stream X is fed to the stirring vessel 25. The top flow I from the clarifier 26 is fed to a distillation column 27 and the bottom flow Z from the clarifier 26 is fed to the stirring vessel 25. The distillate AA formed at the top of the column 7, which is a 90% methanol solution, is fed to the stirring vessel 25.

From 1,000 kg. of 42% ammonium sulfate solution, is obtained a total of 395 kg. of ammonium sulfate, calculated on dehydrated basis. 6% of the input of ammonium sulfate is allowed to be lost as a stream (BB) to the sump of the distillation column 27. This residual material may be employed for the production of more ammonium sulfate solution or disposed of due to content of troublesome impurities.

While the invention has been described by reference to specific embodiments thereof, it is to be understood that this is merely intended to illustrate the invention and that the scope of the invention is to be determined by reference to the appended claims.

We claim:

1. Method of recovering sodium sulfate or ammonium sulfate from a saturated aqueous solution thereof, comprising mixing said solution with aqueous methanol of a methanol concentration selected to exceed any methanol concentration in said saturated solution by a differential predetermined to cause crystallization of the sodium sulfate or ammonium sulfate to proceed only in the metastable range whereby large grain crystals are produced and recovering the crystals.

2. Method according to claim 1, in which the salt being recovered is sodium sulfate and the concentration differential is in the range of from 20 to 25% methanol.

3. Method according to claim 2, in which the salt being recovered is ammonium sulfate and the concentration differential is in the range of from 25 to 35% methanol.

References Cited

UNITED STATES PATENTS

| 2,786,739 | 3/1957 | Eck et al. | 23—119 |
| 2,807,520 | 9/1957 | Duval | 264—38 |
| 3,331,661 | 7/1967 | Bolston et al. | 23—121 |
| 3,424,562 | 1/1969 | Gaska et al. | 23—302 |
| 3,437,451 | 4/1969 | Every et al. | 23—302 |
| 3,472,618 | 10/1969 | Grimsley et al. | 23—119 |

R. T. FOSTER, Assistant Examiner

U.S. Cl. X.R.

23—302, 120, 121

WILBUR L. BASCOMB, Jr., Primary Examiner